US012347986B2

(12) United States Patent
Kuo et al.

(10) Patent No.: US 12,347,986 B2
(45) Date of Patent: Jul. 1, 2025

(54) CABLE CONNECTOR AND METHOD OF ASSEMBLING THE SAME

(71) Applicant: ACES ELECTRONICS CO., LTD., Taoyuan (TW)

(72) Inventors: Rong-Hsun Kuo, Taoyuan (TW); Meng-Hsun Ko, Taoyuan (TW)

(73) Assignee: ACES ELECTRONICS CO., LTD., Taoyuan (TW)

( * ) Notice: Subject to any disclaimer, the term of this patent is extended or adjusted under 35 U.S.C. 154(b) by 400 days.

(21) Appl. No.: 18/075,756

(22) Filed: Dec. 6, 2022

(65) Prior Publication Data

US 2023/0223725 A1 Jul. 13, 2023

(30) Foreign Application Priority Data

Jan. 12, 2022 (TW) .................................. 111101342

(51) Int. Cl.

| | |
|---|---|
| ***H01R 24/86*** | (2011.01) |
| ***H01R 13/11*** | (2006.01) |
| ***H01R 13/40*** | (2006.01) |
| ***H01R 13/629*** | (2006.01) |
| ***H01R 13/639*** | (2006.01) |

(52) U.S. Cl.

CPC ............. *H01R 24/86* (2013.01); *H01R 13/11* (2013.01); *H01R 13/40* (2013.01); *H01R 13/629* (2013.01); *H01R 13/639* (2013.01)

(58) Field of Classification Search

CPC ....... H01R 24/86; H01R 13/11; H01R 13/512

USPC .................................................. 439/660, 499

See application file for complete search history.

(56) References Cited

U.S. PATENT DOCUMENTS

| | | | | |
|---|---|---|---|---|
| 10,490,937 | B1 * | 11/2019 | Su | H01R 24/64 |
| 10,944,211 | B1 * | 3/2021 | Ho | H01R 13/6275 |
| 2006/0035513 | A1 * | 2/2006 | Yohn | H01R 13/6592 439/460 |
| 2019/0199031 | A1 * | 6/2019 | Surana | H01R 13/64 |

* cited by examiner

*Primary Examiner* — Tulsidas C Patel

*Assistant Examiner* — Thaslimur Rahman

(74) *Attorney, Agent, or Firm* — Muncy, Geissler, Olds & Lowe, P.C.

(57) ABSTRACT

A cable connector includes socket body, terminal set, telescopic sleeve, elastic element, fastening member, locking element and cable sleeved with positioning ring piece and insulating sleeve. The socket body has screw hole on middle, plug-in portion and fixed portion located at two sides, and locking hole located on fixed portion. A glue seat is formed on the soldering area between the soldering ends of the plug-in terminals of the terminal set and the core wires of the cable. A fixing sleeve is movably joined to terminal block and then fitted to the outside of glue seat. The outer diameter of plug-in portion of socket body is sequentially sleeved with elastic element and movable telescopic sleeve. The socket body and terminal block and socket body and cable can be fixed together by fastening member and locking element in combination with screw hole and locking hole of socket body.

23 Claims, 6 Drawing Sheets

CABLE CONNECTOR AND METHOD OF ASSEMBLING THE SAME

This application claims the priority benefit of Taiwan patent application number 111101342, filed on Jan. 12, 2022.

BACKGROUND OF THE INVENTION

1. Field of the Invention

The present invention relates to a cable connector and method of assembling the same, especially a kind of fixing a socket body and a terminal block and the socket body and a cable together by means of a fastening member and a locking element, respectively, to ensure the stability of the overall structure, and to achieve fast assembly and yield retention, resulting in optimized processes to reduce costs.

2. Description of the Related Art

General connectors are used in the connection components and accessories of electronic signals and power supplies. The main function is to provide connections between various electronic devices or equipment, and to ensure accurate signal transmission. With the different products, power and environment of use, connectors have developed various types, and can be widely used in consumer electronic products such as computers, notebook computers, smart phones, or household appliances, telecommunication and communication equipment, automobile, industry, transportation, aviation and other fields.

Furthermore, today's traditional multi-core cable connectors provide a plurality of core wires of a cable and the corresponding plug-in terminals to form an electrical connection by soldering, and a multi-cable cable connector is conventionally used, and this invention is about electrical connectors for multiple cables. This connector effectively simplifies the connection and disconnection between the plug and socket even in tight spaces, confined work areas or when the socket is fastened to the device. In addition, the electrical stability of the connection is guaranteed by protecting the connector between the plug and the cable from peeling or bending when subjected to impact, and quick connection and disconnection are established to prevent electric shock to improve the reliability of the appliance. However, although this connector structure solves some of the known problems, the structure of this multi-cable connector is very complicated, and the overall problem of preventing rotation during plugging and unplugging and the retreat of the terminal block is not perfect. It is possible that the connector and the cable are twisted, which may cause the multiple core wires in the cable to be broken, detached, poor contact or short circuit. Because this connector structure has too many components, the conventional products have the disadvantages of complex structure, high cost and difficult assembly. Therefore, how to match the characteristics of the assembling and plugging action of the electrical connector and provide a locking structure sufficient for the electrical connector to be matched with the mating connector to improve the service life has become a problem to be considered and solved by those skilled in the art.

SUMMARY OF THE INVENTION

Therefore, in view of the above-mentioned problems and deficiencies, the inventor collected relevant information, evaluated and considered from various parties, and based on years of experience accumulated in this industry, through continuous creation and modification, he designed this cable connector and method of assembling the same.

It is therefore the main object of the present invention to provide a cable connector, which comprises a socket body, a terminal set, a telescopic sleeve, an elastic element, a fastening member, a locking element and a cable sleeved with a positioning ring piece and an insulating sleeve. The socket body is a hollow pipe, comprising a plug-in portion located on one side, a fixed portion located on an opposite side, a locking hole located on a rear side of an outer diameter surface of the fixed portion, a plug-in space defined in the plug-in portion, and a fixed space defined in the fixed portion in communication with the plug-inspace. The terminal set comprises a terminal block, a plurality of plug-in terminals, a glue seat, and a fixing sleeve. The terminal block has a butt end located in the plug-in space of the socket body. The plug-in terminals are set in said terminal block. The plug-in terminals each has a soldering end exposed on the outside of the terminal block and respectively soldered with one respective core wire of the cable. The glue seat is provided at the soldering area between the core wires of the cable and the soldering ends of the plug-in terminals. The fixing sleeve is movably joined to one side of the terminal block and fitted to the outside of the glue seat. The telescopic sleeve is movably attached onto the socket body, having a limiting space formed therein. The elastic element is located between the limiting space of the telescopic sleeve and the outer diameter of the plug-in portion of the socket body. The locking element is locked into the locking hole of the fixed portion of the socket body and pressed against the positioning ring piece of the cable, so that the socket body and the cable are fixed together, which can effectively prevent the cable from being displaced when it is pulled by external force, thereby preventing the soldering position of each plug-in terminal and the corresponding core wire from breaking or peeling off.

The secondary object of the cable connector of the present invention lies in the socket body, and the socket body and the terminal block can be fixed together through the setting of the screw hole of the socket body with the fastening member. When the docking connector and the cable connector of the present invention are used for plugging and unplugging, the terminal block will not cause the problem of rotation and retreat in the plug-in space and fixed space in the socket body due to multiple plugging and unplugging.

The cable connector assembling method of the present invention comprises the steps of: passing the plug-in terminals of the terminal set through the respective accommodating holes of the terminal block of the terminal set to expose the respective soldering ends of the plug-in terminals on the outside of the terminal block; setting the positioning ring piece and the insulating sleeve on the outer diameter of the cable in sequence and squeezing the positioning ring piece on the cable; soldering the respective core wires of the cable to the respective soldering ends of the plug-in terminals; attaching the fixing sleeve to one side of the terminal block and gluing the soldering area between the core wires of the cable and the soldering ends of the plug-in terminals with insulating glue to form a glue seat, and then placing the elastic element on the outer diameter of the limiting space of the telescopic sleeve and the plug-in portion of the socket body and positioning the rear side of the telescopic sleeve at the outer diameter of the socket body to let the two ends of the elastic element be respectively pressed against the outer diameter of the socket body and the inner diameter of the telescopic sleeve; pushing the assembled terminal set and cable into the fixed space of the fixed portion of the socket body to let the front butt end of the terminal block of the terminal set be located in the leading edge of the plug-in space of the socket body; locking the fastening member into the screw hole of the socket body to fix the terminal block, so that the telescopic sleeve is in a movable and retractable state by the elastic support of the elastic element outside the plug-in portion of the socket body; and locking the locking element into the locking hole on the socket body to position the positioning ring piece on the cable and to fix the ring-shaped buckling portion of the insulating sleeve to the outer diameter of the fixed portion of the socket body. Through the above steps, the cable connector can be assembled into one body, so as to achieve reduction of processing steps, assembly procedures and costs, and has the advantages of simple structure, stable plugging and unplugging, reliable positioning, low cost, and no torsional fracture of electrical connector and the cable.

Another object of the present invention is to set a positioning ring piece with a section on the cable, and the locking element is locked into the locking hole of the fixed portion of the socket body and then pressed against the section of the positioning ring piece to form a stable positioning, so that the socket body and the cable are locked to the position of the positioning ring piece by the locking element, which can effectively prevent the cable from being displaced when it is pulled by external force, thereby preventing the soldering position between each plug-in terminal and the corresponding core wire from breaking or peeling off.

DETAILED DESCRIPTION OF THE PREFERRED EMBODIMENT

Figure 1:
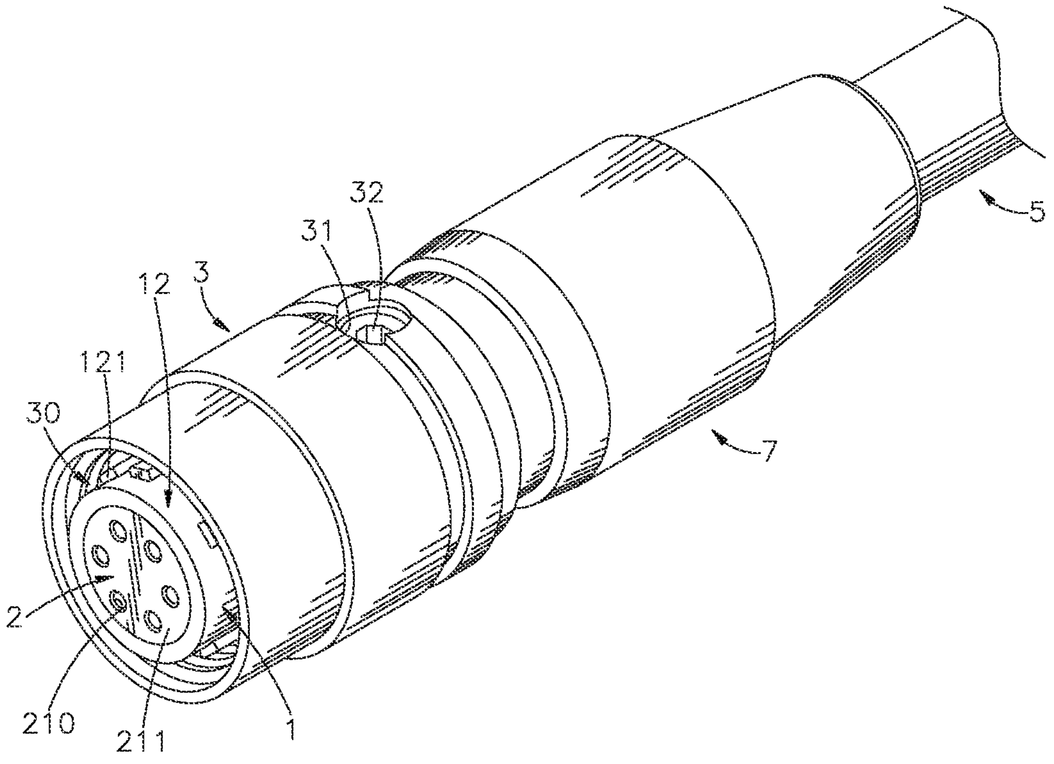
FIG. 1 is an oblique top elevational view of a cable connector in accordance with the present invention.

In order to achieve the above objects and effect, the technical means used in the present invention and its structure, implementation method, etc., the preferred embodiment of the present invention is hereby described in detail and its features and functions are as follows, so as to be fully understood.

Please refer to FIGS. 1, 2, 3, and 4. It can be clearly seen from the drawings that the cable connector of the present invention comprises a socket body 1, a terminal set 2, a telescopic sleeve 3, an elastic element 4, and a cable 5 sleeved with a positioning ring piece 6 and an insulating sleeve 7.

The socket body 1 is a hollow pipe, the center of which is a base portion 11, and the two sides of the base portion 11 are respectively a plug-in portion 12 and a fixed portion 13. The outer diameter surface of the base portion 11 is provided with a screw hole 110, and a stepped stop portion 1101 turned downward is formed between the base portion 11 and the plug-in portion 12. There is a plug-in space 120 in the hollow part of the plug-in portion 12, and a plurality of guide blocks 121 with axially equidistant projections are formed at the outer diameter and two sides are provided with button holes 122, which are used for guiding and locking when the docking connector and the cable connector of the present invention are used for plugging and unplugging. A fixed space 130 extending through the plug-in space 120 is formed in the hollow part of the fixed portion 13, a guide rail 1301 extending axially is protruded in the fixed space 130, and a locking hole 131 is penetrated at the outer diameter, and a ring groove 132 is formed between the base portion 11 and the locking hole 131. The locking hole 131 can be used for the locking of a locking element 133.

The terminal set 2 comprises a terminal block 21 and a plurality of plug-in terminals 22. The terminal block 21 comprises a plurality of penetrating accommodating holes 210, a stepped surface 2111 formed at the outer diameter of a butt end 211 thereof, a groove 212 formed at the outer diameter surface of the other side of the butt end 211, a bearing surface 214 extending outward from the groove 212 to the edge, a metal fixing ring 215 having upper and lower engaging portions 2151 and a cut surface 2152 flush with the groove 212 integrally molded on the outer diameter thereof at the groove 212 to increase the overall strength of the terminal block 21 after locking, a guide groove 213 extending axially on the bottom for sliding on the guide rail 1301, and a snap groove 2131 formed in the guide groove 213. The plug-in terminals 22 each have a plug-in end 221 and an opposing soldering ends 222. The plug-in ends 221 of the plug-in terminals 22 are respectively set in the accommodating holes 210, and the soldering ends 222 of the plug-in terminals 22 are exposed on the outside of the terminal block 21 adjacent to the groove 212, so that the core wires 51 of the cable 5 are soldered to the soldering ends 222 of the plug-in terminals 22 respectively to form an electrical connection and be fixed as a whole. A glue seat 23 is formed by gluing and fixing to the soldering area with insulating glue, and a fixing sleeve 24 is also set up outside the glue seat 23. The upper and lower positions on the same side of the fixing sleeve 24 are provided with a resisting portion 242 and a hook 241, and the resisting portion 242 and the hook 241 are respectively abutted against the bearing surface 214 and snapped into the snap groove 2131 of the guide groove 213.

The telescopic sleeve 3 is a hollow tube body attached onto the base portion 11 of the socket body 1, having a limiting space 30 formed in the hollow tube body, a protruding stop portion 301 located on the inner diameter of the limiting space 30, and a through hole 31 provided at the outer diameter surface. The through hole 31 is for a fastening member 32 to pass through and lock into the screw hole 110 of the base portion 11 of the socket body 1 and then press against the cut surface 2152 at the groove 212 of the terminal block 21 to form a positioning.

The elastic element 4 is placed on the outer diameter of the plug-in portion 12 of the socket body 1 and set in the limiting space 30 of the telescopic sleeve 3, so that the two ends of the elastic element 4 abut against the stepped stop portion 1101 of the base portion 11 and the protruding stop portion 301 of the telescopic sleeve 3 to form elastic support.

Figure 2:
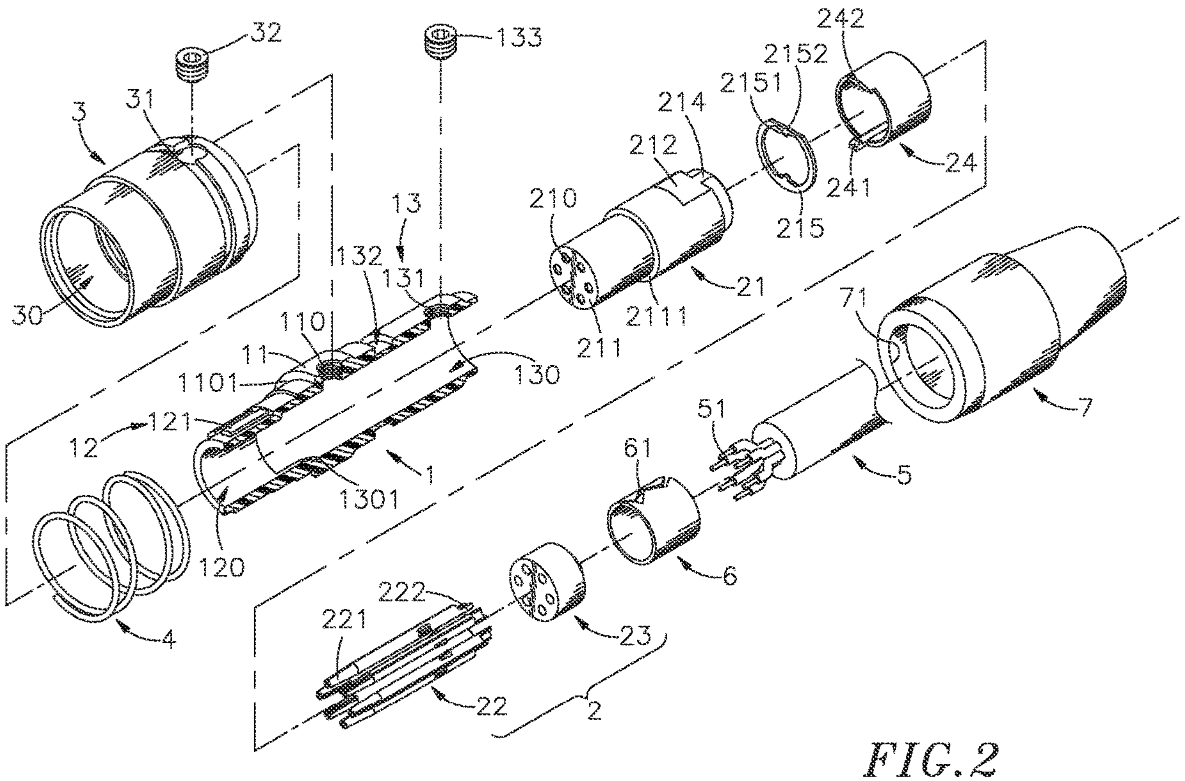
FIG. 2 is a sectional exploded view of the cable connector in accordance with the present invention.
Figure 3:
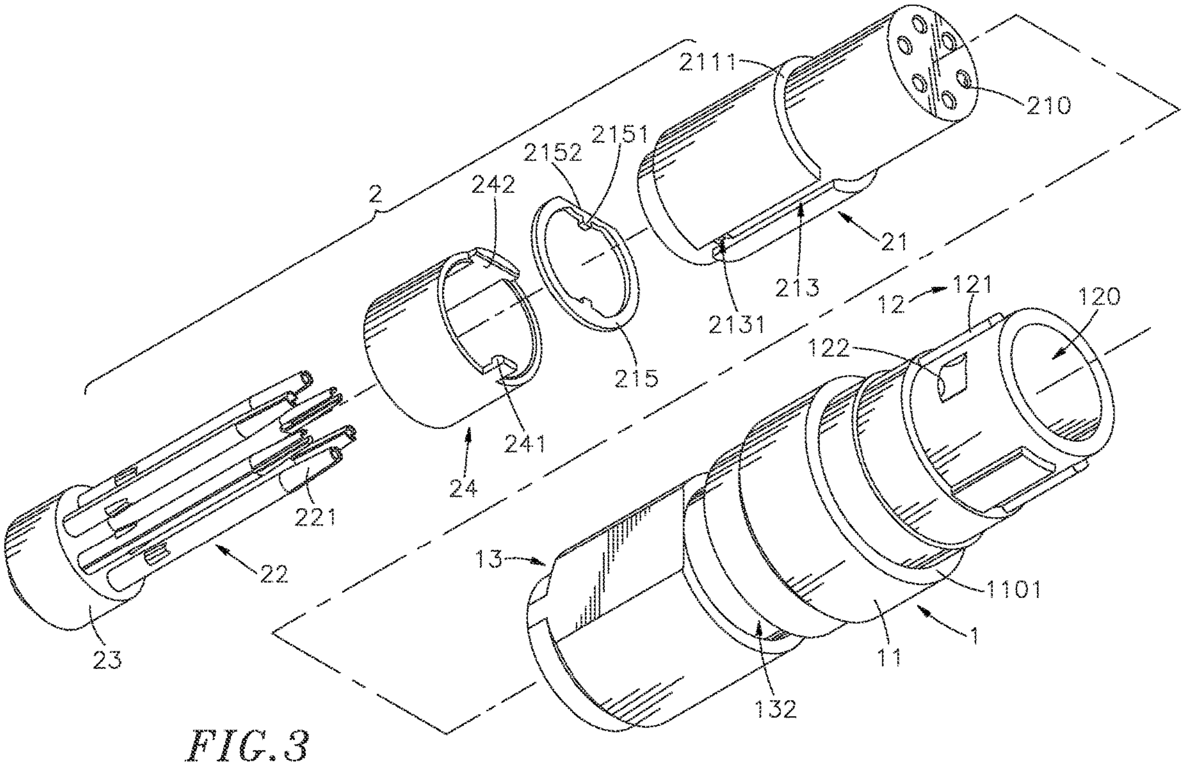
FIG. 3 is a sectional exploded view of the terminal set of the cable connector in accordance with the present invention.
Figure 5:
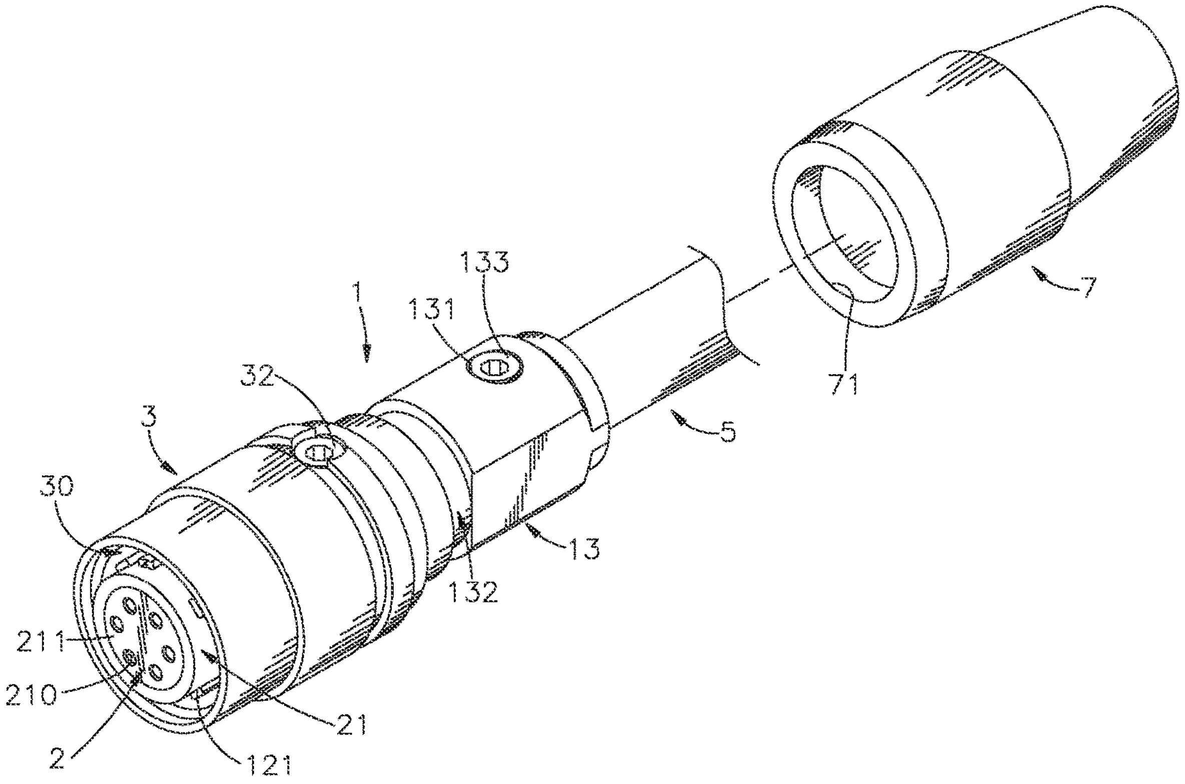
FIG. 5 is an exploded view of the present invention when assembling the insulating sleeve.
Figure 6:
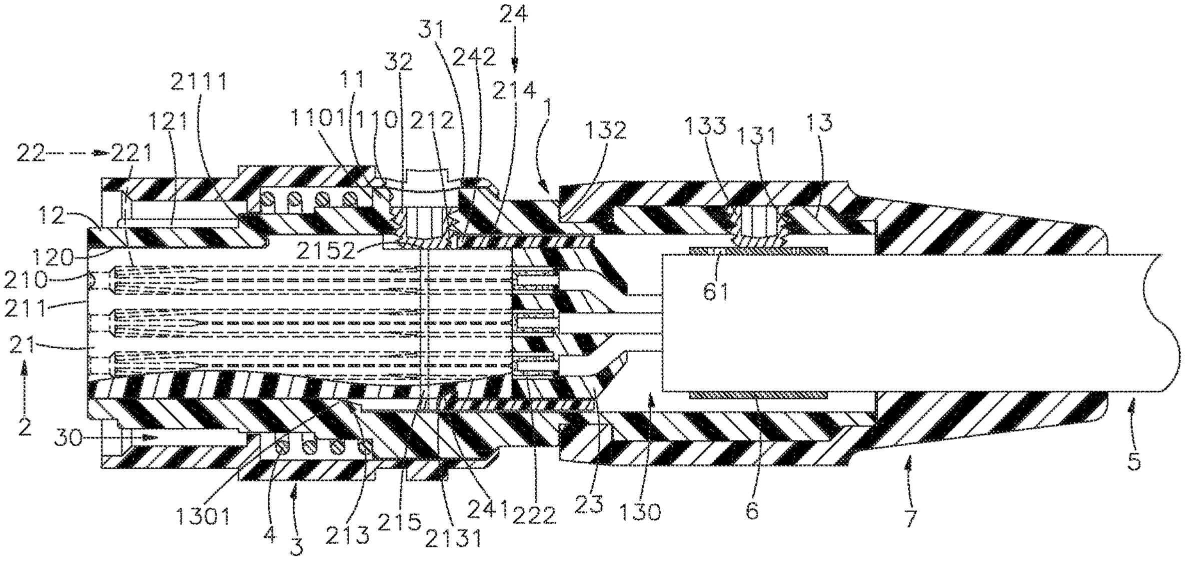
FIG. 6 is a side sectional view of the present invention.

Please refer to FIGS. 2, 5 and 6, the positioning ring piece 6 has a section 61, and the positioning ring piece 6 is sleeved and clamped on the cable 5 to be positioned. After the locking element 133 is locked into the locking hole 131 of the fixed portion 13 of the socket body 1, it is pressed against the section 61 of the positioning ring piece 6 to form a positioning, so that the socket body 1 and the cable 5 are locked to the position of section 61 of the positioning ring piece 6 by the locking element 133, which can effectively prevent the cable 5 from being displaced when pulled by external forces, thereby avoiding breakage or peeling at the soldering position between each plug-in terminal 22 and the corresponding core wire 51.

Please refer to FIGS. 1, 5 and 6. The insulating sleeve 7 is sleeved on the outer diameter of the cable 5, and is fitted and fixed in the ring groove 132 on the outer diameter of the fixed portion 13 of the socket body 1 by a ring-shaped buckling portion 71.

Please refer to FIGS. 1, 2, 3, 4, and 6. It can be clearly seen from the drawings that the steps of the present invention during assembly are as follows: First, the plurality of plug-in terminals 22 of the terminal set 2 are passed through the accommodating holes 210 of the terminal block 21 to form positioning, and the soldering ends 222 are exposed on the outside of the terminal block 21 adjacent to the groove 212. Then set the positioning ring piece 6 and the insulating sleeve 7 on the outer diameter of the cable 5 in sequence, and squeeze the positioning ring piece 6 on the cable 5 to form a positioning. Then solder the plurality of core wires 51 to the soldering ends 222 of the plug-in terminals 22 to form a fixing, and glue the soldering area with insulating glue to form the glue seat 23, and abut the resisting portion 242 of the fixing sleeve 24 against the bearing surface 214 and snap the hook 241 of the fixing sleeve 24 into the snap groove 2131 in the guide groove 213 to form a positioning. Then fit the fixing sleeve 24 assembled in the terminal block 21 to the outside of the glue seat 23, and place the elastic element 4 in the limiting space 30 of the telescopic sleeve 3 and on the outer diameter of the plug-in portion 12 of the socket body 1, and the rear side of the through hole 31 of the telescopic sleeve 3 is positioned at the rear edge of the base portion 11 to form a positioning, so that the two ends of the elastic element 4 are respectively abutted against the stepped stop portion 1101 of the base portion 11 and the protruding stop portion 301 of the telescopic sleeve 3 to form an elastic support state for use. Please refer to FIGS. 1, 4, 5 and 6, and then insert the terminal block 21, multiple plug-in terminals 22 and fixing sleeve 24 of the terminal set 2 and the cable 5 into the fixed space 130 in the fixed portion 13 of the socket body 1, so that the guide groove 213 of the terminal block 21 is pushed along the guide rail 1301 in the fixed space 130 of the socket body 1, and the front butt end 211 of the terminal block 21 is located in the front edge of the plug-in space 120 of the socket body 1 to form a fixed position. Then pass the fastening member 32 through the through hole 31 of the telescopic sleeve 3 and lock it in the screw hole 110 of the socket body 1 to press against the cut surface 2152 of the metal fixing ring 215 at the groove 212 of the terminal block 21 to form a positioning, so that the telescopic sleeve 3 can be moved and stretched by the elastic support of the elastic element 4 outside the plug-in portion 12 of the socket body 1. Then lock the locking element 133 into the section 61 of the positioning ring piece 6 on the cable 5 through the locking hole 131 of the socket body 1 to form a positioning. At this time, the ring-shaped buckling portion 71 of the insulating sleeve 7 can be fixed in the ring groove 132 on the outer diameter of the fixed portion 13 of the socket body 1 to form a positioning. Through the above steps, the cable connector is assembled into one.

Figure 4:
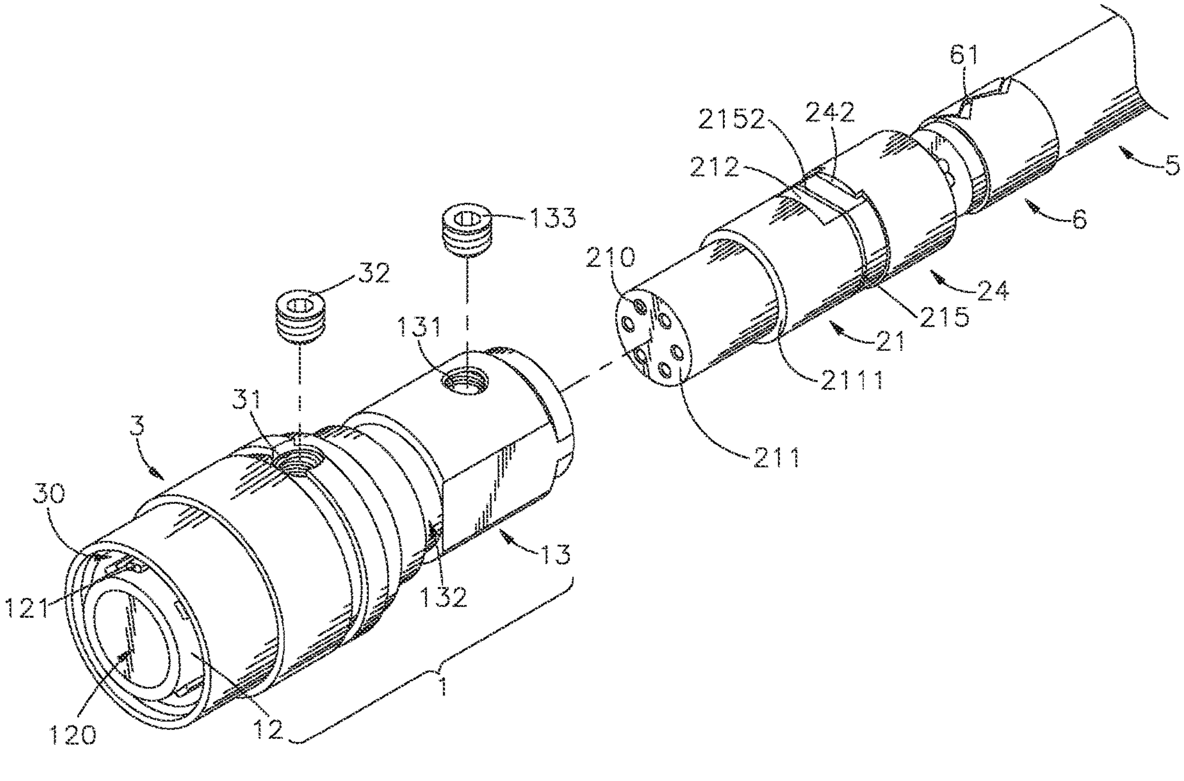
FIG. 4 is an exploded view of the present invention when assembled.

Please refer to FIGS. 2, 4, and 6. Because the present invention fixes both the socket body 1 and the terminal block 21 together through the fastening member 32, when the docking connector and the cable connector of the present invention are used for plugging and unplugging, the terminal block 21 will not cause the problem of rotation and retreat in the plug-in space 120 and fixed space 130 in the socket body 1 due to multiple plugging and unplugging.

Please refer to FIGS. 4 and 6. It can be clearly seen from the drawings that the soldering ends 222 of the plug-in terminals 22 to which the plurality of core wires 51 of the cable 5 are soldered are fixed and glued with insulating glue to form the glue seat 23 in the soldering area. The present invention can also be made by molding together on the outer diameter of the ring groove 132 of the fixed portion 13 of the socket body 1 and the outer diameter of the cable 5. Because the glue seat 23 is externally fitted with a fixing sleeve 24 and movably joined on the terminal block 21 to form a fixed position, the fixing sleeve 24 can be forcibly positioned on the wall of the hollow inner diameter of the socket body 1, so that the assembly of the terminal set 2, the cable 5 and the socket body 1 is more stable and has no gaps. However, the above-mentioned embodiment is not intended to limit the scope of the patent application of the present invention, and all other equivalent changes and modifications made without departing from the technical spirit disclosed in the present invention shall be included in the patent scope covered by the present invention.

Please refer to FIGS. 5 and 6. It can be clearly seen from the drawings that the insulating sleeve 7 of the present invention can be directly fixed in the ring groove 132 on the outer diameter of the fixed portion 13 of the socket body 1 with the ring-shaped buckling portion 71. It can also be made by molding together with the outer diameter of the ring groove 132 of the fixed portion 13 of the socket body 1 and the outer diameter of the cable 5. If it is molded integrally, the outer diameter of the fixed portion 13 will form a height difference, and the insulating sleeve 7 will be turned up and down at the inner diameter after the integral molding, which can effectively solve the peeling and fracture of the soldering point when the cable 5 and the plug-in terminals 22 are pulled away or rotated, so as to strengthen the overall pulling and fixing force. In addition, because the insulating sleeve 7 is covered outside the fixed portion 13 and the locking element 133, it can further prevent the locking element 133 from being accidentally loosened or dropped due to vibration. However, the above-mentioned embodiment is not intended to limit the scope of the patent application of the present invention, and all other equivalent changes and modifications made without departing from the technical spirit disclosed in the present invention shall be included in the patent scope covered by the present invention.

The above detailed description is for a preferred practical implementation description of the present invention, but this embodiment is not intended to limit the scope of the patent application of the present invention, and all other equivalent changes and modifications accomplished without departing from the technical spirit disclosed in the present invention shall be included in the scope of the patent covered by the present invention.

What the invention claimed is:

1. A cable connector, comprising a socket body, a terminal set, a telescopic sleeve, an elastic element, a fastening member, a locking element and a cable sleeved with a positioning ring piece and an insulating sleeve, wherein:

said socket body is a hollow pipe, comprising a plug-in portion located on one side, a fixed portion located on an opposite side, a locking hole located on a rear side of an outer diameter surface of said fixed portion, a plug-in space defined in said plug-in portion and a fixed space defined in said fixed portion in communication with said plug-in space;

said terminal set comprises a terminal block, a plurality of plug-in terminals, a glue seat and a fixing sleeve, said terminal block having a butt end located in said plug-in space of said socket body;

said plug-in terminals being set in said terminal block, said plug-in terminals each having a soldering end exposed on the outside of said terminal block and respectively soldered with one respective core wire of said cable, said glue seat being provided at the soldering area between said core wires of said cable and said soldering ends of said plug-in terminals, said fixing sleeve being movably joined to one side of said terminal block and fitted to the outside of said glue seat;

said telescopic sleeve is movably attached onto said socket body, said telescopic sleeve having a limiting space formed therein;

said elastic element is located between said limiting space of said telescopic sleeve and the outer diameter of said plug-in portion of said socket body;

said locking element is locked into said locking hole of said fixed portion of said socket body and pressed against said positioning ring piece of said cable to form a positioning, so that said insulating sleeve covers said fixed portion and said locking element.

2. The cable connector as claimed in claim 1, wherein said socket body further comprises a base portion connected between said plug-in portion and said fixed portion and a stepped stop portion turned downward and formed between said base portion and said plug-in portion; said telescopic sleeve is provided with a protruding stop portion at the inner diameter of said limiting space; said elastic element has two ends thereof respectively abutted between said stepped stop portion and said protruding stop portion.

3. The cable connector as claimed in claim 2, wherein said socket body further comprises said base portion connected between said plug-in portion and said fixed portion and a screw hole located on said base portion; said terminal block is integrally formed with a metal fixing ring on the outer diameter of an opposite end thereof remote from said butt end; said fastening member is locked into said screw hole of said base portion of said socket body and then pressed against said metal fixing ring to form a positioning.

4. The cable connector as claimed in claim 1, wherein said terminal block further comprises a plurality of accommodating holes, and said plug-in terminals are respectively set in said accommodating holes.

5. The cable connector as claimed in claim 1, wherein said terminal block further comprises a stepped surface formed at the outer diameter of said butt end.

6. The cable connector as claimed in claim 1, wherein the outer diameter of said plug-in portion of said socket body is provided with a plurality of guide blocks equidistant in the axial direction.

7. The cable connector as claimed in claim 1, wherein said plug-in portion of said socket body is provided with button holes at two sides.

8. The cable connector as claimed in claim 1, wherein said glue seat is fixed to said soldering area with an insulating glue by molding.

9. The cable connector as claimed in claim 1, wherein said socket body further comprises a guide rail extending axially and protruded in said fixed space; said terminal block further comprises a guide groove extending axially on a bottom thereof for sliding on said guide rail of said socket body.

10. The cable connector as claimed in claim 1, wherein said terminal block further comprises a guide groove extending axially on a bottom thereof, a bearing surface located on an outer diameter surface edge thereof remote from said butt end and a snap groove formed in said guide groove; said fixing sleeve comprises a resisting portion abutted against said bearing surface of said terminal block, and a hook snapped into said snap groove of said guide groove.

11. The cable connector as claimed in claim 1, wherein said positioning ring piece has a section; said locking element locks into said locking hole of said fixed portion of said socket body and then presses against said section of said positioning ring piece to form positioning.

12. The cable connector as claimed in claim 2, wherein said socket body further comprises said base portion connected between said plug-in portion and said fixed portion and a screw hole located on said base portion; the outer diameter of said terminal block is molded in one piece with a metal fixing ring; said fastening member is locked into said screw hole of said socket body and then pressed against said metal fixing ring of said terminal block to form a positioning.

13. The cable connector as claimed in claim 1, wherein said telescopic sleeve is provided with a through hole at an outer diameter surface thereof for said fastening member to pass through and lock into said socket body.

14. A method of assembling a cable connector comprising a socket body, a terminal set, a telescopic sleeve, an elastic element, a fastening member, a locking element and a cable sleeved with a positioning ring piece and an insulating sleeve, the method comprising the steps of:

passing a plurality of plug-in terminals of said terminal set through respective accommodating holes of a terminal block of said terminal set to expose respective soldering ends of said plug-in terminals on the outside of said terminal block;

setting said positioning ring piece and said insulating sleeve on the outer diameter of said cable in sequence, and squeezing said positioning ring piece on said cable;

soldering respective core wires of said cable to the respective said soldering ends of said plug-in terminals;

attaching a fixing sleeve to one side of said terminal block and gluing the soldering area between said core wires of said cable and said soldering ends of said plug-in terminals with insulating glue to form a glue seat, and then placing said elastic element on the outer diameter of a limiting space of said telescopic sleeve and a plug-in portion of said socket body and positioning a rear side of said telescopic sleeve at the outer diameter of said socket body to let two ends of said elastic element be respectively pressed against the outer diameter of said socket body and the inner diameter of said telescopic sleeve;

pushing the assembled said terminal set and said cable into a fixed space of a fixed portion of said socket body to let the front butt end of said terminal block of said terminal set be located in the leading edge of a plug-in space of said socket body;

locking said fastening member into a screw hole of said socket body to fix said terminal block, so that said telescopic sleeve is in a movable and retractable state by the elastic support of said elastic element outside said plug-in portion of said socket body; and locking said locking element into a locking hole on said socket body to position said positioning ring piece on said cable and to fix a ring-shaped buckling portion of said insulating sleeve to the outer diameter of said fixed portion of said socket body.

15. The method as claimed in claim 14, wherein said socket body further comprises a base portion connected between said plug-in portion and said fixed portion and a stepped stop portion turned downward and formed between said base portion and said plug-in portion; said telescopic sleeve is provided with a protruding stop portion at the inner diameter of said limiting space; said elastic element has two ends thereof respectively abutted between said stepped stop portion and said protruding stop portion.

16. The method as claimed in claim 14, wherein said socket body further comprises a base portion connected between said plug-in portion and said fixed portion and a screw hole located on said base portion; said terminal block is integrally formed with a metal fixing ring on the outer diameter of an opposite end thereof remote from said butt end; said fastening member is locked into said screw hole of said base portion of said socket body and then pressed against said metal fixing ring to form a positioning.

17. The method as claimed in claim 14, wherein said positioning ring piece has a section; said locking element locks into said locking hole of said fixed portion of said socket body and then presses against said section of said positioning ring piece to form positioning.

18. The method as claimed in claim 15, wherein said screw hole of said socket body is located on said base portion.

19. The method as claimed in claim 14, wherein said insulating sleeve is provided with a ring-shaped buckling portion; said socket body has a ring groove located on the outer diameter of said fixed portion, so that said ring-shaped buckling portion is fixed in said ring groove to form a fitting position.

20. The method as claimed in claim 14, wherein said insulating sleeve is provided with a ring-shaped buckling portion, and the outer diameter of said fixed portion of said socket body is provided with a ring groove, and the outer diameter of said ring groove and the outer diameter of said cable are formed by molding.

21. The method as claimed in claim 14, wherein said socket body further comprises a guide rail extending axially and protruded in said fixed space; said terminal block further comprises a guide groove extending axially on a bottom thereof for sliding on said guide rail of said socket body.

22. The method as claimed in claim 14, wherein said terminal block further comprises a guide groove extending axially on a bottom thereof, a bearing surface located on an outer diameter surface edge thereof remote from said butt end and a snap groove formed in said guide groove; said fixing sleeve comprises a resisting portion abutted against said bearing surface of said terminal block, and a hook snapped into said snap groove of said guide groove.

23. The method as claimed in claim 14, wherein said telescopic sleeve is provided with a through hole at an outer diameter surface thereof for said fastening member to pass through and lock into said socket body.

* * * * *